United States Patent [19]

Bouchet et al.

[11] 3,760,113

[45] Sept. 18, 1973

[54] LINE FINDER FOR A COMMON CONTROL TELEPHONE EXCHANGE

[75] Inventors: Claude Bouchet, La Varenne-St-Hilaire; Roger Meliani, Sevres; Vladimir Tomasovitch, Meudon-La-Foret, all of France

[73] Assignee: International Standard Electric Corporation, New York, N.Y.

[22] Filed: Jan. 26, 1972

[21] Appl. No.: 220,986

[52] U.S. Cl. .......... 179/18 FG

[51] Int. Cl. .......... H04q 3/24

[58] Field of Search .......... 179/18 FG, 18 FF, 179/18 F, 18 FA, 18 AB

[56] References Cited

UNITED STATES PATENTS

| | | | |
|---|---|---|---|
| 3,073,907 | 1/1963 | Alterman et al. | 179/18 FG |
| 3,231,681 | 1/1966 | Warman | 179/18 FA |
| 3,337,692 | 8/1967 | Bruglemans | 179/18 F |
| 3,176,078 | 3/1965 | Warman | 179/18 F |

FOREIGN PATENTS OR APPLICATIONS

| | | | |
|---|---|---|---|
| 1,158,585 | 12/1963 | Germany | 179/18 FF |
| 2,010,474 | 10/1970 | Germany | 179/18 FF |

*Primary Examiner*—Thomas W. Brown
*Attorney*—C. Cornell Remsen, Jr. et al.

[57] ABSTRACT

Subscribers' line circuits and a linefinder are disclosed for use in a common control telephone exchange to determine the status of subscriber lines. Biasing potentials and switches in the line circuit together with logic circuits in association with the linefinder and the line circuits enable the combination to identify lines requesting service and those in faulty operating condition.

4 Claims, 6 Drawing Figures

| POSITIONS | AL | SN | SP | N L | N S | N EV | P L | P S | P EV |
|---|---|---|---|---|---|---|---|---|---|
| REST | 1 | 1 | 1 | 1 | 1 | 0 | 1 | 0 | 0 |
| CALLING | 0 | 1 | 1 | 0 | 1 | 1 | 0 | 0 | 0 |
| CONNECTION | 0 | 0 | 0 | 0 | 0 | 0 | 0 | 0 | 0 |
| FALSE CALL | 0 | 0 | 1 | 0 | 0 | 0 | 0 | 1 | 1 |
| FREE | 1 | 0 | 1 | 1 | 0 | 1 | 1 | 1 | 1 |

LINE FINDER FOR A COMMON CONTROL TELEPHONE EXCHANGE

BACKGROUND OF THE INVENTION

1. Field of the Invention

The present invention relates to a telephone exchange subscribers' line scanner, or line finder. More particularly, it relates to a scanner or line finder which may be used in a common control telephone exchange for enabling the central unit to obtain information on the status of subscribers' lines.

2. Description of the Prior Art

In a well-known telephone exchange, a line is supplied with current by its individual unit each time it is "looped", i.e., each time it needs service. A line is "looped" when the telephone handset is lifted; it is "unlooped" when the handset is replaced. A free line is unlooped; it requires no service. When the subscriber lifts his handset, the line is looped in the telephone set; this particular state characterizes a calling line which must be detected and its status signalled to the central unit in order that the latter may carry out the corresponding processing. The line then ceases to be fed by its individual unit and it is connected to common units of the exchange which will receive the called number and establish the call, assuming the called line is free. In case the called line is busy, the calling line is disconnected from the common units and it is again fed by its individual unit. It is still looped and must be considered as busy but not calling. It will be said that the line is parked. As long as it is parked it requires no service. When the subscriber replaces his handset, the line becomes unlooped, this particular state which characterizes a parked line becoming free must also be detected and signalled in order that the line be released, that is, cease to be parked will and become free. Indeed, a line can be parked in other cases of operation. As an example, there can be cited the cases when a calling subscriber does not transmit a number, dials an incomplete number or a non-used number.

From the preceding, it can be seen that it is not sufficient to know whether a line is looped or not to determine if it is necessary to advise the central unit in order that the latter carries out a processing concerning this line. It is also necessary to know the line situation, that is, to know if, while current-fed by its individual unit, it is free or parked. The individual line unit may itself deliver a signal giving this indication (free or parked line) at the same time as a loop signal (looped or unlooped line). There will be found, for example, in the French Pat. application No. 70/46461, filed on Dec. 23, 1970 in the name of COMPAGNE GENERALE DE CONSTRUCTIONS TELEPHONIQUES, entitled "Equipment individual de ligne telephonique" (Telephone line individual unit), the description of an equipment delivering such signals.

In other respects, when a parked line is looped, as above indicated, it requires no service. Now, this line may be faulty. Further to an accidental short circuit, for example, it may be found calling, but no number has been transmitted. According to a well-known method, it is then usual to disconnect it from common units and to place it in the situation of a parked line. It is only the indefinite prolongation of this situation which will characterize a fault. It is obviously desirable to be able to identify the faulty lines. The detection of service requests as above-defined does not meet this requirement. Indeed it could be provided to complete it by the detection of parked and looped lines, in addition to the lines requiring normally a service, but this would not be suitable, since a line is faulty only when it remains indefinitely in this situation.

SUMMARY OF THE INVENTION

The present invention meets this requirement by providing a subscribers' line scanner, or linefinder, including means for receiving from a central unit, either a search order for service requests, or a search order for parked lines, means for interrogating successively subscribers' line units, in a scanning cycle, as well as means conditioned by the search order for service requests and analysing the signals delivered by each subscriber's line unit, in order to produce a stop signal interrupting the scanning cycle and calling the central unit when the situation signal indicates that the line is free, whereas the loop signal indicates that it is looped, and when these signals indicate that the line is parked and unlooped, and means conditioned by the search order for parked lines and analysing the signals delivered by each subscriber's line unit in order to produce a stop signal when the situation signal indicates that the line is parked, so that the scanner may be alternately used, on the one hand, by the central unit, for the detection of service requests and, on the other hand, for the detection of parked lines.

BRIEF DESCRIPTION OF THE DRAWINGS

Various other features will be disclosed from the following which is given by way of non-limited example and with reference to the accompanying drawings which represent.

DESCRIPTION OF A PREFERRED EMBODIMENT

Figure 1:
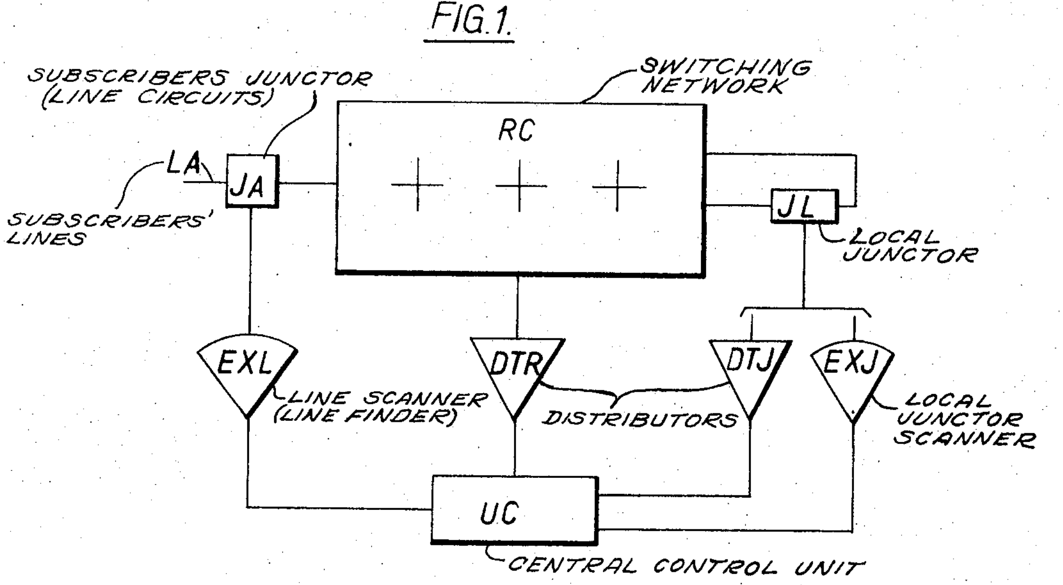
FIG. 1 is the block diagram of a common control telephone exchange wherein may be used the scanner, according to the invention.

FIG. 1 represents the simplified block diagram of a common control telephone exchange. The subscribers' lines LA are each terminated by an individual subscriber's line unit which may be referred to as a subscribers line circuit, or a subscriber's junctor JA. Through its subscribers junctor JA, each line is connected to an outlet of a switching network RC. As an example, a switching network constituted by three crossbar switch stages has been represented. The inlets of this network RC are connected to different types of common units, as required, among which have been represented a local junctor JL. A local junctor JL has two accesses, each connected to an inlet of the switching network RC. It is provided for the establishment of a local call; a calling line is thus connected to one access, through the switching network RC, then a called line is connected to the other access, in the same way. The local junctor supplies on both lines, the necessary currents and signals. It supervises the call and detects in particular the subscribers' handset replacement, at the end of the call.

The operation of this exchange is controlled by a central unit UC which is nothing but a stored program electronic processor. This central unit UC receives information delivered by the subscribers' junctors JA, through a line scanner EXL, and by the common units such as the local junctor JL, through a junctor scanner EXJ. The central unit UC processes the information thus obtained, in a way defined by the stored program, and deduces the operations to be executed with the view of the call establishment, that is, mainly the connections to be established in the switching network RC and the signals that must be sent by the common units on the lines. The corresponding orders are transmitted to the switching network RC through a distributor DTR and to the junctors through a distributor DTJ.

In such an exchange, the subscribers' line scanning is momentous. Indeed, the subscribers' lines are numerous and need to be scanned at a relatively high frequency; the scanner EXL thus has great dimensions and a high speed operation. It scans, for example, several thousands of lines in a few hundreds of milliseconds. Besides, in order to limit information transfers from subscribers' line junctors JA to the central unit UC, it is desirable that the scanner EXL, instead of transmitting the conditions of all the scanned lines, only signals the lines whose condition necessitates the intervention of the central unit UC, such as the calling lines. To this end, the subscriber's line junctor JA supplies the scanner EXL not only with an indication concerning the condition (looped or unlooped) of the line LA itself, but also with an indication on the situation (parked or non-parked) wherein the line is found, which will enable the scanner EXL to determine if it needs or not the intervention of the central unit UC.

Figure 2:
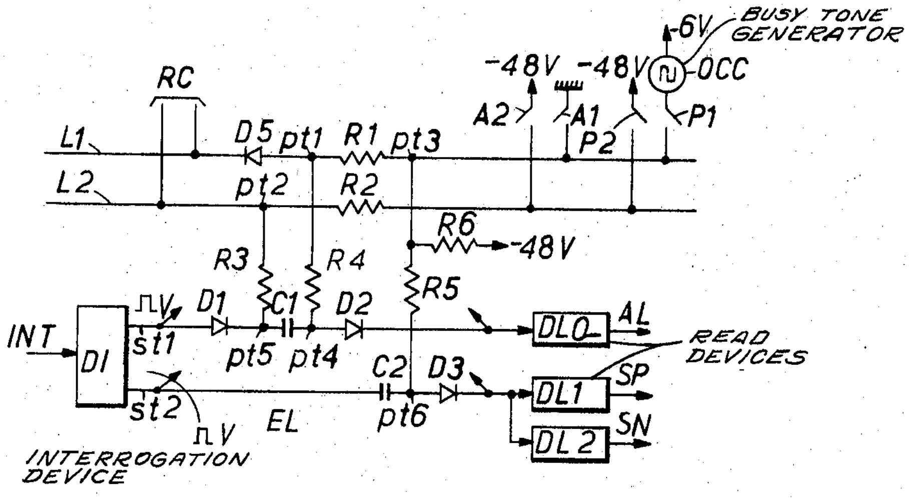
FIG. 2 is the diagram of the circuits of a well-known subscriber's line unit.

FIG. 2 represents a well-known subscriber's line unit EL giving the necessary information.

In FIG. 2, the subscriber's line wires are represented in L1 and L2. These line wires may be connected to a common unit of the exchange, through the switching network RC or may be fed by the subscriber's line unit. To this end, when the line is free, non-represented means close the contacts A1 and A2. Wire L1 is earthed, through diode D5, resistor R1 and contact A1; wire L2 is connected to the negative feeding potential −48V, through resistor R2 and contact A2. Resistors R1 and R2 have the same values. If the line is at rest, the telephone handset being replaced, wires L1 and L2 are not looped; the point *pt*1 is at the earth potential whereas the point *pt*2 is at −48V potential. On the contrary, as soon as the subscriber lifts his handset, the line is looped in the telephone set and a loop current flows. The point *pt*1 becomes negative (−16V, for example) whereas the point *pt*2 becomes less negative (−32V, for example). The value of the voltage between both points (48 or 16 V) thus characterizes the subscriber's line condition and will make it possible to detect if it is looped or not.

When the line, after failure of a connection attempt, for example, is disconnected from the exchange common units, non-represented means close the contacts P1 and P2. Wire L1 is connected to a −6V potential, through diode D5, resistor R1, contact P1 and a busy tone generator OCC. Simultaneously, wire L2 is connected to the −48 V potential, through resistor R2 and contact P2. The line being still looped, the potential of point *pt*1 is more negative than −6V (−20 V, for example) whereas the potential of point *pt*2 is less negative than −48 V (−34V, for example). The subscriber also receives the busy tone which invites him to replace his handset. When this is done, the line is no longer looped, point *pt*1 potential becomes −6 V, whereas point *pt*2 potential becomes −48V. As in the case of a free line, the value of the voltage difference between these two points (14V or 42V) characterizes the two conditions of the line.

In brief, the line may be connected either to the exchange common units, through the switching network RC, the contacts A1, A2, P1 and P2 being open, normally fed through contacts A1 and A2, or fed through the contacts P1 and P2. It will be said that the line is connected, free or parked. It is necessary to distinguish these three possible situations. This is done by observing point *pt*3 potential. Indeed, when the line is connected, point *pt*3 is biased at potential −48 V, through resistor R6, the diode D5 being then blocked, if wire L1 potential becomes higher, which will be generally the case. When the line is free, point *pt*3 potential becomes the earth potential, through contact A1. When the line is parked, point *pt*3 potential becomes −6V, through contact P1 and the generator OCC whose resistance is negligible.

The voltage between point *pt*1 and *pt*2 is estimated by a circuit including capacitor C1 connected to the line wires through two high value resistors R3 and R4, as well as the decoupling diodes D1 and D2.

Point *pt*3 potential is estimated by means of a circuit including the capacitor C2 connected to point *pt*3 through the high value resistor R5, as well as the decoupling diode D3.

Both circuits are controlled by an interrogation device D1 having one inlet INT and two outlets *st*1 and *st*2. At rest, both outlets are at potential −48V. In response to an order received on its inlet INT, the interrogating device DI delivers a positive interrogating impulse on each of its outlets. The device DI may be common to the several line junctors such as EL, which is indicated by multiple arrows situated on its outlets. It will thus interrogate several line junctors simultaneously.

Both estimation circuits control, in their turn read devices DLO, DL1 and DL2 common to several line junctors (multiple arrows). The device DLO delivers a signal AL when it receives a positive voltage. The device DL1 delivers a signal SP, also when it receives a positive voltage. On the contrary, the device DL2 delivers a signal SN only when it receives a higher voltage, for example +15V.

OPERATION OF A PREFERRED EMBODIMENT

Now will be described the operation of these circuits, first assuming that the line is free and unlooped.

As above indicated, point *pt*1 is at the earth potential. Point *pt*2 is at −48V potential. Point *pt*3 is at the earth potential. Consequently, capacitor C1 is charged, through resistors R3 and R4, point *pt*4 being earthed and point *pt*5 at −48 V potential. The device DI delivers a positive interrogating pulse on its outlet *st*1, having a 29 V amplitude, for example, whose peak reaches −19V. This impulse is found entirely at point *pt*5 and it appears in point *pt*4 as a positive impulse (estimation signal) whose peak reaches +29 V. The read device DLO operates and delivers a signal AL.

Simultaneously, a 18V amplitude positive impulse is sent to capacitor C2. As point *pt*6 was initially at the earth potential, it appears in this point a positive impulse (estimation signal) of +18V. The read devices DL1 and DL2 both operate and deliver signals SN and SP.

If the line is looped, point *pt*3 potential remains unchanged, whereas the potentials of points *pt*1 and *pt*2 are respectively −16V and −32V, these potentials being found at points *pt*4 and *pt*5, as diodes D1 and D2 are blocked.

During the interrogation, the read signals SN and SP are obtained, as previously, but, due to the potentials (−32V and −16V) which bias capacitor C1, the peak of the impulse obtained at point *pt*4 only reaches −3V. Indeed, at point *pt*5 the potential passes from −32V to −19V; the amplitude of the interrogating impulse is only 13V. At point *pt*4, a 13V impulse from −16V supplies an estimation signal whose peak does not exceed −3V. As this signal does not exceed the earth level, the device DLO does not operate and does not deliver the read signal AL.

Now it will be assumed that the subscriber's line is parked and unlooped. As mentioned above, point *pt*1 is at −6V potential, point *pt*2 is at −48 V potential, whereas point *pt*3 is at −6V potential. It can be seen that with respect to the case of a free line unlooped, wire L1 is only at −6 V potential instead of the earth potential. Therefore, during an interrogation, the signals delivered by the estimation circuits have a peak amplitude reduced by 6V. The read device DLO receives an impulse of +29V − 6V = +23V and delivers the read signal AL. The circuits DL1 and DL2 receive an estimation signal of +18V − 6V = +12V. Under these conditions, the device DL1 operates and delivers the signal SP whereas the device DL2 does not operate.

Accordingly, when a line is parked and it is unlooped, the interrogation of its line junctor only gives the signals AL and SP, the signal SN being absent.

If the line is looped, nothing is changed for signals SP (supplied) and SN (absent). On the contrary, due to the potentials (−20V and −34V) which bias capacitor C1, the peak of the impulse sent to the device DLO remains negative (−5V) and signal AL is absent.

Now will be considered the case of a connected line. The feed contacts A1, A2, P1 and P2 are then open. Points *pt*3 and *pt*1 are biased by the −48 V potential through resistor R6, the diode D5 being blocked, or by a potential even more negative from the line, if diode D5 is conducting. Point *pt*4 and *pt*6 thus are also at −48 V potential. The 29V and 18V impulses supplied by the device DI thus cannot render these points positive and no read device operates. The read signals AL, SP and SN are absent.

In summary, the line may successively, occupy five states: *a*) line at rest, free and unlooped, *b*) calling line, free and looped, *c*) line connected, looped or unlooped, *d*) line in permanent loop condition parked and looped, *e*) releasing line, parked and unlooped. The signals AL, SP and SN supplied by the read devices DLO, DL1, DL2 make it possible to distinguish the different states. The table of FIG. 6, in its four left columns, summarizes the five states and the relevant signals, the presence of a signal being indicated by digit 1 and its absence by digit 0.

THE LINE SCANNER CIRCUITS

As above noted, the interrogating device D1 is common to several subscribers' line junctors which will be simultaneously interrogated. In the same way, the group of read devices DLO, DL1, DL2 is common to several line junctors. This corresponds to a matrix arrangement of the scanning circuits now to be described with reference to FIG. 3.

Figure 3:
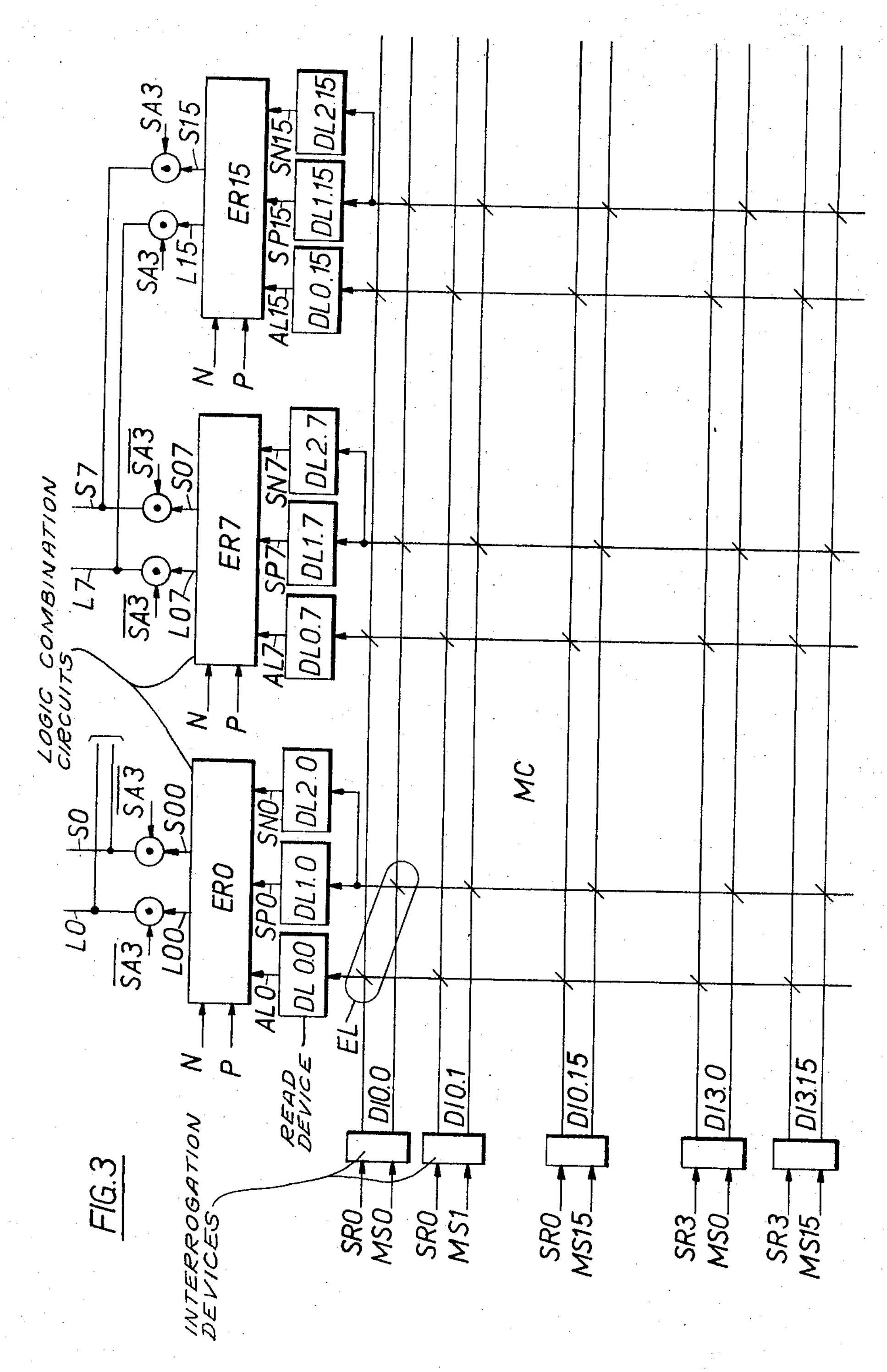
FIG. 3 is the diagram of the scanning circuits of a scanner, according to the invention.

FIG. 3 represents the scanning circuits of a subscribers' line scanner such as the scanner EXL of FIG. 1 designed in order to scan subscribers' line junctors such as those of FIG. 2 and including processing circuits of the scanning signals, provided according to the present invention.

These matrix scanning circuits MC include interrogating devices D10-0 to D13-15 arranged in four groups of 16 interrogating devices, the first one comprising the devices D10-0 to D10-15, whereas the last one comprises the devices D13-0 to D13-15. Each device corresponds to the device DI of FIG. 2. The enable input represented by INT in FIG. 2 is illustrated in FIG. 3 by two selection inputs SRO and MSO, for D10-0, which must be marked simultaneously in order that the device operates. All the interrogative devices are thus controlled by a set of four signals SRO to SR3 designating a group of interrogating devices and by a set of 16 signals MSO to MS15 designating one interrogating devive in the group. During each interrogating process, only one device operates at once. The outputs of each interrogating device control a pair of row wires of the scanning matrix MC.

There are provided 16 groups of three read devices. The first group includes the read devices DLO-O, DL1-O and DL2-0, the eighth group includes the devices DLO-7, DL1-7 and DL2-7, the last group includes the devices DLO-15, DL1-15 and DL2-15. The three read devices of each group correspond to the three devices DLO, DL1 and DL2 of FIG. 2.

The outlets of the different read device groups are represented in ALO, SPO and SNO, for the first group, AL7, SP7 and SN7 for the eighth group and AL15, SP15 and SN15 for the last one. These outlets correspond respectively to the outlets AL, SP and SN of FIG. 2.

The two input wires proper to each group of three read devices are connected to one scanning matrix column. Between the output conductors of the interrogating device D10-0 and the input conductors of the group of three read devices DL0-0, DL1-0 and DL2-0, are represented both estimation circuits of a subscriber's line junctor EL which may be that of FIG. 2, in the form of two oblique strokes. Such a subscriber's line junctor thus is connected to the crosspoint between each pair of row conductors and each pair of column conductors. The scanning matrix of FIG. 3 thus enables 1,024 subscribers' line junctors to be served.

During a scanning operation controlled, for example, by signals SRO and MSO, the interrogating device D10–O operates and delivers the interrogating impulses on the first pair of the matrix row conductors. The 16 subscribers' line junctors associated with this row accordingly send estimation signals towards the 16 groups of read devices. Each group of read devices operates and supplies, in return, read signals characterizing the state of one among the 16 lines. The output signals of the group of read devices DLO-O, DL1-0 and DL2-0 are transmitted to a logic combination circuit ERO which besides, receives either a signal N or a signal P according to the object of the scanning in processs. Further on will be explained the operation of this circuit ERO as well as the way it combines the three read signals derived from the interrogation of a subscriber's line junctor in order to give two state signals L00 and SOO. The other combination circuits and, in particular, ER7 and ER15 are identical.

At the output of each combination circuit are situated two AND gates represented by a circle containing a dot (sign of logic intersection). The gates associated with the circuits ERO to ER7 are controlled by a condition $\overline{SA3}$, whereas the gates of the circuits ER8 (not represented) to ER15 are controlled by the complementary condition SA3. During a scanning process, one of these two conditions is supplied, so that the output signals of only eight combination circuits are transmitted on conductors LO, SO to L7, S7. These signals correspond to the states either of the first eight interrogated lines, or of the last eight lines.

Figure 4:
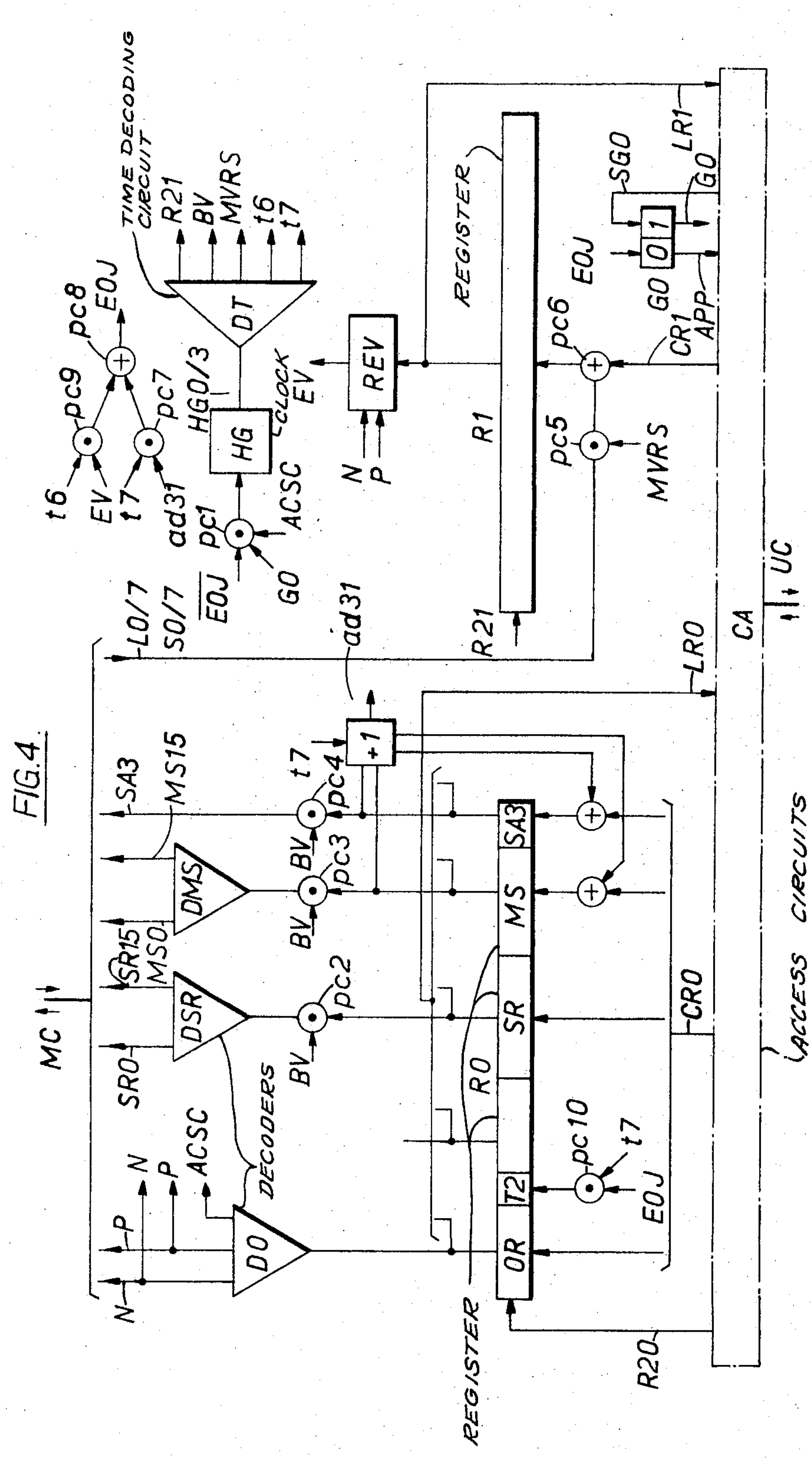
FIG. 4 is the diagram of the control circuits of a scanner, according to the invention.

FIG. 4 shows the control circuits of scanner EXL of FIG. 1. These control circuits are associated with the scanning circuits of FIG. 3. They receive from the central unit UC, scanning instructions, deliver the appropriate control signals to the interrogating devices, gather the state signals constituting the scanning results, analyse these results and, if required, call the central unit to transmit them to it.

The control circuits of FIG. 4 mainly include a register RO receiving from the central unit a scanning instruction and all the relevant information, a register R1 in which are written the scanning results and that the central unit can read out, if necessary, various decoding devices DO, DSR, DMS, a clock, HG combined with a time decoding circuit DT as well as different data processing circuits which will be defined in the course of the description of the scanner operation. These circuits include, in particular, the bistable ON/-OFF GO.

These control circuits communicate with the central unit UC through access circuits CA. A data transfer channel connects the access circuits CA to the central unit UC. The access circuits CA are designed according to a well-known way which depends on the nature of the transfer channel. They are beyond the scope of the invention. It will be only noted that they enable the central unit UC to read out the contents of register RO, displayed on conductors LRO, as well as the contents of register R1 displayed on conductors LR1. They also enable the central unit UC to erase the contents of register RO, by a reset signal RZO, and to write any desired item of information into register RO, through the link CRO, and into register R1, through the link CR1. Finally, they transmit a call signal APP towards the central unit and enable the central unit to set bistable GO through the link SGO.

It will be assumed initially that all the circuits are at rest, the scanner being unoperated. Registers RO and R1, in particular, contain no information. Bistable GO is in position O. A condition $\overline{EOJ}$ (inverse of condition EOJ) is also present.

The central unit UC writes a scanning instruction into register RO through the access circuits and the link CRO. This instruction is a 16 bit data word stored by 16 bistables constituting the register RO. This instruction is made up of the following parts:

—an indication OR having three bits, which specifies the type of the instruction to be executed;

—an indication SR having four bits, which designates one group of interrogating devices;

—an indication MS having four bits, which designates one interrogating device within the group;

—one bit SA3 which designates, among the 16 line junctors to be interrogated, either the first eight or the last eight ones.

Four bits of the instruction are not used in the scope of the present invention; the corresponding stages of register RO are situated between those which receive the indications OR and SR. One of them is provided for receiving an indication T2 in a way which will be subsequently described.

The scanner thus receives a scanning instruction specified by OR as well as an address defining a group of eight line junctors which will be first interrogated. It will then interrogate automatically a certain number of similar groups, as it will be further seen.

As soon as the scanning instruction is written into register RO, the indication OR specifying the type of instruction to be executed is transmitted to an instruction decoding circuit DO. The latter, in the present invention, delivers:

—whatever the instruction is, a signal ACSC indicating the presence of an instruction and being used as operating condition;

—A signal N, if the central unit UC asks the scanner to search for lines requesting a service, that is calling or releasing lines.

—a signal P, if the central unit UC asks the scanner to search for parked lines, looped or unlooped.

It will be first assumed that the central unit UC has given the order to search for lines requesting a service and that the decoding circuit DO delivers signals ACSC and N.

The central unit UC then orders to start the scanner by setting bistable GO, through the link SGO.

The condition $\overline{EOJ}$ being present, the signals ACSC and GO, through one AND gate *pc*1, cause the operation of the clock HG. This clock includes a time base driving a four-stage counter delivering signals HGO to HG3 illustrated by the first four waveshapes of FIG. 5. It can be seen that, the four counter stages being initially in position O, the stage HGO delivers a square wave whose positive impulses are referenced TO to T7, whereas each of the other stages HG1 to HG3 changes position when the positive impulse supplied by the preceding stage terminates.

Figures 5, 6:
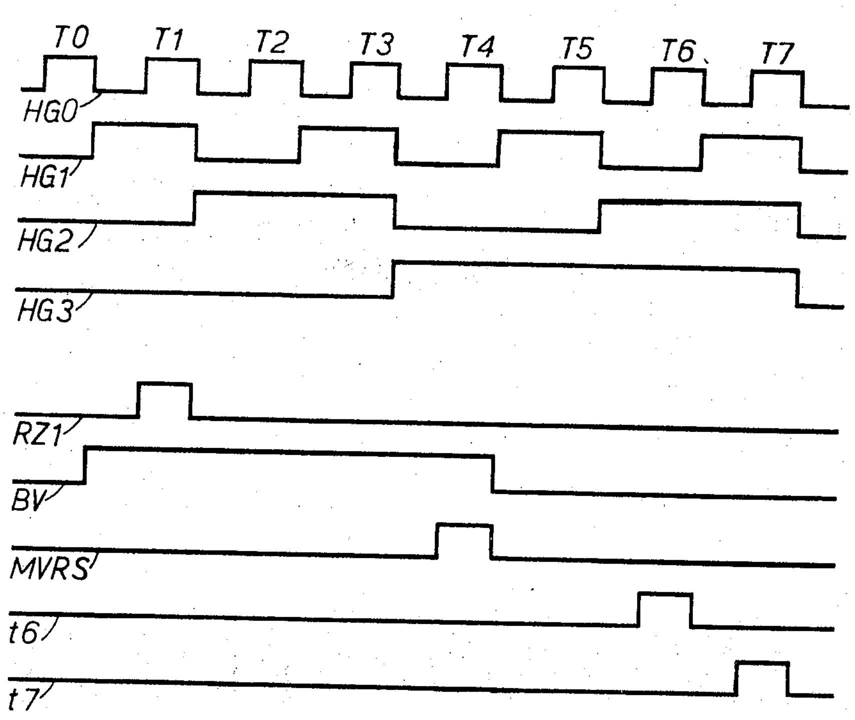
FIG. 5 is waveshapes illustrating the various time base signals used in the scanner of FIGS. 3 and 4.
FIG. 6 is a table illustrating the operation of the read signal analysis circuits included in the scanner of FIGS. 3 and 4.

The signals HGO to HG3 generated by the clock are sent to a time decoding circuit DT which delivers the signals RZ2, BV, MVRS, *t*6 and *t*7 also illustrated by the waveshapes of FIG. 5.

As it can be seen in FIG. 5, the signal BV is the first one to appear at the end of the pulse TO. It controls the gates *pc*2, *pc*3, *pc*4, enabling the transmission of the address towards scanning circuits MC. The gate *pc*2 transmits the indication SR to a decoding device DSR which accordingly delivers a signal on one of conductors SPO to SR15. This makes it possible to designate up to 16 groups of interrogating devices. As the scanning circuits of FIG. 3 only include four groups, designated by SRO to SR3, the control circuits of FIG. 4 may control up to four scanning matrices such as that of FIG. 3. The gate *pc*3 transmits the indication MS to a decoding device DMS which accordingly delivers a signal on one of conductors MSO to MS15, in order to designate an interrogating device within the group. This item of information is transmitted towards the scanning matrix MC and, if required, towards three identical matrices. The gate *pc*4 transmits the indication SA3 in the same way.

As indicated in FIG. 5, the signal BV is delivered from the end of the pulse TO of the clock up to the end of the pulse T4. This duration is that of the line junctor interrogation. The interrogating device (D10-0, FIG. 3) receiving simultaneously the signals SRO and MSO, for example, will deliver the two above described interrogating pulses during the same time period. These interrogating pulses will develop estimation signals at the outlet of the line junctors, read signals and corresponding state signals. According to the value of signal SA3, the state signals corresponding to either the first eight line equipment or the last eight ones will appear on conductors L0/7 and SO/7.

A little while after the beginning of signal BV, the time decoding circuit DT delivers a signal RZ1, corresponding to the impulse T1, which resets all bistables of register R1, if necessary.

At the end of signal BV, when the scanning matrix circuits have had time to operate and that the scanning results are stable on conductors LO/7 and SO/7, the time decoding device DT delivers the signal MVRS. This signal opens the AND gate *pc*5, and the scanning results, through an OR gate *pc*6 (indicated by a cross, sign of the reunion) are transmitted to register R1 in which they are stored.

The contents of register R1 are communicated permanently to an analysis device REV which receives, at the same time, the signal N delivered by the instruction decoding device DO. If one of the interrogated lines is either calling or releasing, the analysis circuit REV delivers the signal EV. It will be assumed that it is not the case to describe first how the scanner progresses.

Then, still referring to the waveshapes of FIG. 5, it can be seen that the time decoding device delivers a signal *t*6 corresponding to the pulse T6 of the clock. Since it has been assumed that the device REV did not supply the signal EV, this time signal has no effect.

Finally, in response to the pulse T7 of the clock, the device DT delivers the time signal *t*7. This signal is transmitted to a circuit marked "+1" which, besides, receives the indications MS and SA3 given by register RO. In response to this signal *t*7, the circuit "+1" delivers a numerical indication equal to that received from register RO, but increased by one unit. At the end of signal *t*7, this indication increased by one unit takes the place of the previous one.

Then, the clock continues to operate and delivers anew the pulse TO and a new operating cycle is completed, identical to that just described, the interrogation concerning the group of eight line junctors bearing the initial address increased by one unit. As long as the scanner does not find any line needing the intervention of the central unit, the scanning progresses this way.

However, it is provided to limit in time the scanner operation. To this end, the circuit "+1" possesses an output *ad*31 which is marked when the indications SA3 and MS respectively equal 1 and 1111, which corresponds to 31 in decimal form. The scanning of this group of line junctors is normally performed, in the described way. If it is also assumed that no line needing the intervention of the central unit is found, at time *t*7, the gate *pc*7 operates and, through the gate *pc*8, delivers a signal EOJ. The complementary signal $\overline{EOJ}$, delivered by an inverter (non-represented), disappears, which stops the clock HG as soon as the pulse T7 ends; it will be ready to start again, at the beginning of a new cycle, by means of an inpulse TO.

Moreover, the combination EOJ.*t*7, through gate *pc*10 sets bistable T2 of register RO, in order to characterize a stop in the operation at the end of the scanning.

Finally, the signal EOJ resets the bistable GO. The disappearance of the condition GO ascertains the clock stop. The bistable GO also delivers the signal APP which calls the central unit UC.

Further on, the central unit UC, answering to the scanner call, will read out register RO contents, through the link LRO. It will find the scanning instruction and the end of scanning indication stored in T2.

As for the scanner, it remains in the state it is until it receives a new instruction from the central unit. If the central unit UC has caused the scanner operation by providing it with an address such as MS, SA3 = 00000, the scanner successively interrogates, in an autonomous way, 32 groups of 8 line junctors, that is, a total of 256. It is obvious that the autonomous scanning could concern a greater or smaller number of lines, according to the requirements of each application.

Now will be described in detail, referring in particular to the table of FIG. 6, the way the read signals generated from the interrogation of each line junctor as well as the situation signals derived from the previous ones are processed. It has already been described, referring to FIGS. 2, 3 and 6 that the interrogation of a line junctor allows the distinction between five states and the values that take the read signals in each of these situations have been defined, this information being summarized in the first four columns of the table of FIG. 6. The next three columns indicate the corresponding values of signals L (for LO to L7), S (for SO to S7) and EV, in the case of normal scanning N the function of which is to search for calling or releasing lines.

The combination of the three read signals AL, SN and SP is achieved, for each interrogated line, in one of the combination circuits ERO to ER15 of FIG. 3. As it can be easily seen from the table of FIG. 6, when a combination circuit receives the signal N, L = AL and S = SN. Two gates are sufficient in each combination circuit to produce the signals L and S from the signals AL and SN, these gates being conditioned by N.

The state signals thus generated are further stored in register R1 of the control circuits in FIG. 4. They are then transmitted to the analysis device REV which also receives the signal N. In this device each pair of signals L and S is the object of a sum module 2 conditioned by signal N and whose result gives the signal EV as indicated by the corresponding column of FIG. 6. The logic circuits achieving this function are well-known.

Consequently, the signal EV is generated during the research of calling or releasing lines, after the reception of the scanning results by register R1, that is, from time T4, if one of the interrogated lines is in one of the states searched for.

Then, at time T6, the combination of signals *t*6 and EV causes the operation of gate *pc*9, which, through gate *pc*8, delivers the signal EOJ. At that time, the clock HG stops, before having delivered the pulse T7. The bistable GO is set in position 0 and the central unit is called.

As above, the central unit answers the call by reading out register RO contents. As the bit T2 is not marked, the central unit UC evolves that the scanning has just detected a searched for state. The contents of register R give the address of the goup of eight lines just interrogated. The central unit UC reads out register R1 contents, through the link LR1, in order to know the scanning results. In the central unit, the processing of these results will enable the identification of the calling or releasing lines and will prepare the corresponding processes.

Besides, as soon as the central unit UC has read out register R1, and without changing register RO contents, it gives the order of setting bistable GO, which starts again the clock HG. The latter first delivers the pulse T7 which increases by one unit the address, then the scanning resumes as above described.

Each time, in a group of eight interrogated lines, one or several lines are found in one of the two states searched for, the same process goes on. Finally, the scanner stops at the end of the scanning as already described.

Now will be considered the case when the central unit UC, for detecting faulty lines, transmits to the scanner a research order for parked lines. The composition of this order which is stored in register RO is the same as a research order for calling or releasing lines, except for the indication OR. During the decoding of this indication, the decoding device DO delivers the signal ACSC and, instead of signal N, signal P.

The scanning process, as long as the interrogated lines are not parked, is exactly the same as in the research of calling or releasing lines.

It will thus be considered the operation of the circuits processing the read and situation signals in order to produce finally the signal EV, referring mostly to the table of FIG. 6.

The combination of the read signals AL, SN and SP characterizing the state of each interrogated line, made in one of the combination units ERO to ER15 (FIG. 3) is different from what it was in the research of calling or releasing lines, due to the fact that these units now receive the signal P, instead of the signal N As indicated by the table of FIG. 6 and more particularly, by its three right columns, signal L is still equal to signal AL, but signal S is now equal to the logic product of the inverse of signal SN by signal SP, which needs an inverter and an AND gate conditioned also by signal P.

To summarize, signal L is in both cases equal to signal AL; $S = SN.N$ in the first case and $S = \overline{SN}.SP.P$ in the second case, all functions that are easy to achieve.

In the case of parked line research, the scanning results thus prepared are further stored in register R1 and transmitted to the analysis device REV. As clearly indicated by the table of FIG. 6, the device REV, conditioned by P, delivers signal EV as soon as it receives at least a signal S, which characterizes a parked line.

Then, like in the case of calling or releasing line research, the scanner stops and calls the central unit UC. The latter reads out registers RO and R1, then starts again the scanning. The central unit UC is thus informed of the parked line identity, each time in orders the scanner to carry out the above described research, every three minutes for example. The results of each research may be compared, in order to show the lines which remain parked and send an appropriate signalling if a same line is found parked four times running in 12 minutes, for example. Then, the line will be considered faulty.

It is to be noted that it is also possible to distinguish in this process the looped lines from the unlooped ones. A parked line remaining looped may be faulty. On the contrary, a parked line which is unlooped must be released by the central unit. If it remains in this state, a failure in the exchange operation is to be feared. A particular signalling will thus be given in order to initiate the appropriate maintenance processes.

It is clearly understood that the preceding descriptions have only been given as an unrestrictive example and that numerous alternatives may be considered without departing from the scope of the invention. The numerical precisions, in particular, have only been given to facilitate the descriptions and may vary with each application.

What is claimed is:

1. In a telephone exchange, a subscribers' line finder operable in combination with a line circuit, the combination comrpising a line circuit biased and switched to provide varying voltage levels depending on the status of the associated subscriber's line;

means in said line circuit responsive to the summation of said voltage levels and of interrogation pulses from an interrogation device to produce selected further potentials;

said further potentials representing status of subscriber's lines, i.e., either the condition or the situation of subscriber's line associated with a line circuit; where the condition refers to whether the line is looped or unlooped and situation refers to whether the line is parked or not parked;

means responsive to said further potentials to provide appropriate read signals;

a logic combination circuit;

said logic combination circuit including means to receive further signals representing a demand for a search for service requests or a search for parked lines;

said logic combination circuit responding to said read signals and to said further signals to provide additional signals representing either the condition of the lines served by said line finder or their situation; and means for applying said further signals to control circuits of the line finder;

whereby the line finder may be used alternatively for detecting and indicating service requests and faulty lines.

2. The invention as claimed in claim 1, in which the means responsive to said further potentials includes a plurality of read devices, said read devices responding to various combination of said further potentials to produce said read signals indicating the status of the respective line, and said logic combination circuit responding to said read signals to provide said further signals indicative of the status of said line.

3. The invention as claimed in claim 1, in which the means responsive to further potentials to provide read signals includes;

read devices to detect a loop signal indicating whether the respective line is looped or unlooped, and read devices to detect a situation signal indicating whether the respective line is free or parked,
said read devices each providing an output signal indicating the status of the respective loop and situation signals.

4. The invention as claimed in claim 3, in which the logic combination circuit responsive to the read signals provides stop signals indicative of the status of said line.

* * * * *